3,387,932
PREPARATION OF TRIMERIC RUTHENIUM TETRACARBONYL

Piero Pino, Pisa, and Guiseppe Braca, S. Frediano a Settino, Pisa, Italy, assignors to Lonza Ltd., Basel, Switzerland
No Drawing. Continuation-in-part of application Ser. No. 341,132, Jan. 29, 1964. This application July 29, 1965, Ser. No. 475,840
Claims priority, application Switzerland, Feb. 1, 1963, 1,292/63; Aug. 5, 1964, 10,200/64
3 Claims. (Cl. 23—203)

ABSTRACT OF THE DISCLOSURE

The preparation of trimeric ruthenium tetracarbonyl is directly effected by reacting a basic ruthenium salt of a carboxylic acid or ruthenium acetylacetonate with carbon monoxide at elevated temperature and pressure, in the presence of a methyl ketone or a lower aliphatic monohydric alcohol which is a solvent for the reactants and contains a reactive hydrogen atom under the reaction conditions.

This application is a continuation-in-part of our application Ser. No. 341,132, filed Jan. 29, 1964, and now abandoned.

The invention relates to the preparation of trimeric ruthenium tetracarbonyl which is useful as catalyst in Reppe syntheses, hydroforming and carbonylating processes.

Three different ruthenium carbonyl compounds have been described in the literature, namely an unstable colorless liquid having the formula $Ru(CO)_5$, a solid compound crystallizing as orange crystals from benzene, whose composition was originally given by M. Manchot and W. J. Manchot (Z. anorg. allg. Chemie 226 (1936), p. 385) as ruthenium enneacarbonyl $Ru_2(CO)_9$, and a green crystallized compound to which the formula $[Ru(CO)_4]_3$ was attributed. Recently, the stable form of the compound considered by W. Manchot to be $Ru_2(CO)_9$ was determined by E. Corey and L. Dahl (J. Am. Chem. Soc., 83 (1961), p. 2203) to be $[Ru(CO)_4]_3$. The structure of the green crystallized compound has not yet been confirmed.

Heretofore, the trimeric ruthenium tetracarbonyl had been prepared either from metallic ruthenium sponge, or from inorganic ruthenium salts such as $RuS_2$ or halides, which were reacted with carbon monoxide under high pressure. In all said reactions, there is first formed rutheniumpentacarbonyl, which is a volatile liquid of low stability and must be isolated; such recovery procedure involves inconvenient manipulations and results in a low yield of trimeric ruthenium tetracarbonyl in the subsequent synthesis.

When reacting CO with an organic ruthenium salt, a direct formation of trimeric ruthenium tetracarbonyl in a single step process was never observed.

It is a principal object of the invention to provide a process for the preparation of trimeric ruthenium tetracarbonyl which avoids the drawbacks presented by the intermediate formation of ruthenium pentacarbonyl.

Other objects and advantages will be apparent on consideration of the specification and claims.

According to the invention, trimeric ruthenium tetracarbonyl is prepared by reacting an organic ruthenium salt with carbon monoxide and hydrogen in the presence of an organic liquid which under the reaction conditions is a solvent for the ruthenium salt, CO and $H_2$, at a temperature of 100 to 250° C., preferably 140 to 160° C., and at a pressure of 50 to 350 atm., preferably 150 to 200 atm.

Suitable organic liquids which are solvents for the reactants under the reaction conditions are, for instance, benzene and similar aromatic hydrocarbons. If the solvent contains an active H atom, the addition of gaseous hydrogen can be omitted. Suitable such solvents are methyl ketones, e.g. acetone, and aliphatic monohydric alcohols having 1 to 4 carbon atoms, such as methanol, propanol, isopropanol, n-butanol, and others.

The reaction can be carried out even with water as solvent though the formation of decomposition and by-products will result in lower yields.

Suitable ruthenium compounds are, for instance, the basic ruthenium salts of carboxylic acids, such as basic ruthenium benzoate, basic ruthenium succinate, basic ruthenium acetate, and the enol compound ruthenium acetylacetonate, which is our preferred starting material.

The reaction pressure may be adjusted by forcing carbon monoxide or a mixture of carbon monoxide and hydrogen in a molar ratio in the range of 5:1 to 1:1, preferably 3:1 to 2.5:1, into the reactor. Any type of pressure-resistant vessel can be used; we prefer to use reactors in which the reaction medium can be shaken, agitated or vibrated.

After termination of the reaction, the formed trimeric ruthenium tetracarbonyl is present essentially in the form of orange-red crystalline platelets in the solvent. The mother liquor can be processed in various ways. It may be distilled off, after separation from the trimeric ruthenium carbonyl, in vacuo whereupon additional trimeric ruthenium tetracarbonyl may be recovered by dissolving it out of the residue, e.g. with acetone, and recrystallization. In another modification, the mother liquor is, prior to or after separation from the trimeric ruthenium tetracarbonyl, left standing for several hours, for instance 3 to 24 hours, in an inert gas atmosphere, for instance carbon monoxide or nitrogen. Such treatment produces an increase of the yield of the trimeric ruthenium tetracarbonyl. It is of course of advantage to recover first the crystalline trimeric ruthenium tetracarbonyl formed in the reaction before the mother liquor is subjected to the after-treatment in an inert gas atmosphere.

Finally, the mother liquor may, after recovery of the trimeric ruthenium tetracarbonyl, be processed for the recovery of metallic ruthenium by evaporating the solvent, calcining the residue, and treating it with hydrogen.

The process of the invention does not only produce high yields but offers the further advantage of a simple recovery of the trimeric ruthenium tetracarbonyl because substantially no insoluble by-products are obtained.

In order to illustrate the invention, the following specific examples are given. It will be understood that variations from the particular compounds and proportions can be made without departing from the invention.

Example 1

3.2 g. of ruthenium acetylacetonate were placed in a shaking autoclave of stainless steel having a capacity of 125 cm.$^3$. The air was swept out, and 30 cm.$^3$ of methanol were introduced. Subsequently, a mixture of carbon monoxide and hydrogen in a molar ratio of 3:1 was forced into the autoclave until a pressure of 155 atm. was reached, and the autoclave was heated at 150° C. with shaking. The autoclave was maintained at 150° C. for about 4 hours, whereby a slight pressure drop was observed.

After cooling, the autoclave was opened and the discharged gas was passed through a trap cooled with liquid air to crystallize any volatile $Ru(CO)_5$ which might have been formed. No such $Ru(CO)_5$ could be detected.

After emptying the autoclave, 1.17 g. of $[Ru(CO)_4]_3$ could be separated as orange-red platelets from the methanol. Additional 0.133 g. of $[Ru(CO)_4]_3$ were obtained by processing the methanolic mother liquor. The total of 1.303 g. of [Ru(CO)₄]₃ corresponds to a yield of 76.3%, calculated on the ruthenium acetylacetonate.

Example 2

The same apparatus as used in Example 1 was filled with 1.06 g. of ruthenium acetylacetonate and 75 cm.³ of benzene. The reaction was carried out at 150 atmospheres under otherwise exactly the same conditions as set forth in Example 1.

The formed trimeric ruthenium tetracarbonyl was completely dissolved in the benzene and was recovered by distilling off the solvent in vacuo. There were obtained 0.35 g. of [Ru(CO)₄]₃, corresponding to a yield of 51.5%.

*Analysis.*—Calc'd: Ru 47.65%. Found 47.09%.

Example 3

1.21 g. of basic ruthenium acetate (30.1% Ru) and, after displacement of the air, 7 cm.³ of methanol were introduced into the autoclave used for the preceding examples. CO and H₂ in a molar ratio of 3:1 were forced into the autoclave until the pressure was 165 atm., and the temperature was raised to 150° C. with shaking. During the reaction, the pressure dropped somewhat. After 3 hours, the reaction was terminating and the autoclave was opened. The discharged gas was passed through a trap cooled with liquid air whereby no Ru(CO)₅ could be detected. 0.05 g. of trimeric ruthenium tetracarbonyl could be recovered at the bottom of the autoclave in form of orange-red platelets. The methanolic mother liquor, after distillation of the methanol and recrystallization of the residue from acetone, yielded 0.130 g. of [Ru(CO)₄]₃. Calculated on the basic ruthenium acetate, the yield was 23.4%.

Example 4

The shaking autoclave used in the preceding examples was charged with 3.83 g. of ruthenium acetylacetonate and, after removal of the air, with 50 cm.³ of methanol. Then CO was forced into the autoclave until a pressure of 153 atm. was reached, and the autoclave was heated up to 150° C. with shaking. While the pressure dropped slightly, the autoclave was kept at said temperature for about 9 hours. After cooling, the autoclave was opened and discharged.

1.02 g. of [Ru(CO)₄]₃ were recovered from the motor liquor as orange-red platelets. The methanolic mother liquor was left standing in a nitrogen atmosphere for additional 12 hours. After removal of the methanol by distillation in vacuo, additional 0.76 g. of [Ru(CO)₄]₃ were obtained.

The yield, calculated on ruthenium acetylacetonate, was 86.8%.

Example 5

An autoclave as described in Example 1 was charged with 1.35 g. of ruthenium acetylacetonate and, after removal of the air, with 25 cm.³ of isopropanol. By means of CO, the pressure was adjusted to 150 atm., and the temperature was raised with shaking, to 154° C. At said temperature, the autoclave was shaken for 3 more hours, whereby the pressure decreased slightly. After cooling and venting, the motor liquor was left standing additional 10 hours under a nitrogen atmosphere. Subsequently, 0.41 g. of [Ru(CO)₄]₃ could be separated from the motor liquor in form of platelets. After processing the mother liquor, additional 0.24 g. of [Ru(CO)₄]₃ could be recovered, corresponding to a total yield of 0.65 g. of [Ru(CO)₄]₃, i.e. 90.3% calculated on ruthenium acetylacetonate.

The following table gives the results of additional examples.

| Example No. | Ruthenium compound | Solvent | Pressure of CO atm. | Temp., °C. | Time, hours | After-treatment Inert gas | After-treatment Time, hours | Yield G. | Yield Percent |
|---|---|---|---|---|---|---|---|---|---|
| 6 | 2 g. ruacetylacetonate | 25 cm.³ n-propanol | 151 | 152 | 5 | Nitrogen | 10 | 0.74 | 69.2 |
| 7 | do | 25 cm.³ water | 150 | 150 | 7 | | | 0.22 | 20.6 |
| 8 | do | 30 cm.³ n-butanol | 142 | 160 | 5 | Nitrogen | 12 | 0.53 | 49.5 |
| 9 | 2 g. basic rusuccinate | do | 150 | 160 | 9 | do | 8 | 0.64 | 64 |
| 10 | 2 g. ruacetylacetonate | 30 cm.³ acetone | 152 | 160 | 7 | do | 10 | 0.18 | ¹ 42 |
| 11 | do | 27 cm.³ methylethylketone | 149 | 160 | 5 | do | 10 | 0.177 | ¹ 49.4 |

¹ In example 10, there were recovered 1.2 g. of unreacted ruthenium acetyl acetonate, and in Example 11 1.37 g. In both examples, the yields were calculated on reacted ruthenium acetyl acetonate.

Formation of trimeric tetracarbonyls of other metals of the VIIIth group of the periodic system by the reaction of CO and H₂ with organic salts of such metals, for instance with the iron salt of acetylacetonate, could not be observed.

It is to be understood that the term "compound containing a hydrogen atom which is reactive under the reaction conditions" is intended to cover compounds subject to the Zerewitinoff determination (Merck, 7th ed., page 1480), or compounds which may be subjected to the Zerewitinoff determination under the reaction conditions, or compounds which under reaction conditions may form other compounds which may be subjected to the Zerewitinoff determination.

We claim:
1. A process for the direct preparation of an orange-red trimeric ruthenium tetracarbonyl from organic ruthenium compounds comprising reacting in the absence of air an organic ruthenium compound selected from a group consisting of basic ruthenium salts of carboxylic acids and ruthenium acetylacetonate with carbon monoxide at a temperature of 140 to 160° C. and at a pressure in the approximate range of 150 to 200 atmospheres in the presence of a compound selected from the group consisting of methyl ketones and aliphatic monohydric saturated alcohols having 1 to 4 carbon atoms, said compound containing a reactive hydrogen atom and being a solvent for the reactants under the reaction conditions, said carbon monoxide being substantially the sole gaseous reactant, and separating the obtained trimeric ruthenium tetracarbonyl from the reaction medium.

2. The process as claimed in claim 1 comprising carrying out the process in an autoclave, releasing the autoclave pressure after termination of the reaction, and maintaining after said pressure release the solution of the trimeric ruthenium tetracarbonyl during 3 to 24 hours under an inert gas atmosphere, thereby increasing the yield of crystalline ruthenium tetracarbonyl.

3. The process as claimed in claim 1 wherein said compound is a monohydric saturated alcohol.

References Cited

UNITED STATES PATENTS

| | | | |
|---|---|---|---|
| 2,473,993 | 6/1949 | Gresham et al. | 23—203 |
| 2,477,554 | 7/1949 | McKeever | 23—203 |
| 2,717,201 | 9/1955 | Passino | 23—203 X |
| 2,865,716 | 12/1958 | Hasek | 23—203 |
| 2,880,066 | 3/1959 | Closson et al. | 23—203 |
| 2,964,387 | 12/1960 | Podall et al. | 23—203 |
| 3,236,597 | 2/1966 | Knap | 23—203 |

FOREIGN PATENTS 860,645   2/1961   Great Britain.

MILTON WEISSMAN, *Primary Examiner.*

OSCAR R. VERTIZ, *Examiner.*

B. H. LEVENSON, *Assistant Examiner.*